United States Patent
Vogt et al.

(10) Patent No.: US 9,671,047 B2
(45) Date of Patent: Jun. 6, 2017

(54) POLYETHYLENE OF RAISED TEMPERATURE RESISTANCE

(71) Applicant: Basell Polyolefine GmbH, Wesseling (DE)

(72) Inventors: Heinz Vogt, Tegernheim (DE); Shahram Mihan, Bad Soden (DE); Gerd Mannebach, Münstermaifeld (DE); Lenka Richter-Lukesova, Hofheim (DE); Markus Meierhöfer, Hürth (DE); Holger Brüning, Mainz (DE)

(73) Assignee: Basell Polyolefine GmbH, Wesseling (DE)

(*) Notice: Subject to any disclaimer, the term of this patent is extended or adjusted under 35 U.S.C. 154(b) by 0 days.

(21) Appl. No.: 15/028,690

(22) PCT Filed: Sep. 24, 2014

(86) PCT No.: PCT/EP2014/070318
§ 371 (c)(1),
(2) Date: Apr. 11, 2016

(87) PCT Pub. No.: WO2015/055392
PCT Pub. Date: Apr. 23, 2015

(65) Prior Publication Data
US 2016/0298795 A1     Oct. 13, 2016

(30) Foreign Application Priority Data

Oct. 14, 2013   (EP) .................................... 13188441

(51) Int. Cl.
*F16L 9/12*       (2006.01)
*C08F 10/02*   (2006.01)
*C08F 210/16* (2006.01)

(52) U.S. Cl.
CPC ................ *F16L 9/12* (2013.01); *C08F 10/02* (2013.01); *C08F 210/16* (2013.01)

(58) Field of Classification Search
CPC ............ F16L 9/12; C08F 10/02; C08F 210/16
See application file for complete search history.

(56) References Cited

U.S. PATENT DOCUMENTS

| | | |
|---|---|---|
| 2004/0242785 A1 | 12/2004 | Palmlof |
| 2007/0093621 A1 | 4/2007 | Meier et al. |
| 2011/0262671 A1 | 10/2011 | Pakkanen et al. |
| 2011/0268902 A1 | 11/2011 | Pakkanen et al. |

(Continued)

FOREIGN PATENT DOCUMENTS

| | | |
|---|---|---|
| WO | WO 03/033586 A1 | 4/2003 |
| WO | WO 2005/019280 A1 | 3/2005 |
| WO | WO 2005/103095 A1 | 11/2005 |

(Continued)

OTHER PUBLICATIONS

PCT International Search Report & Written Opinion mailed Nov. 24, 2014 for PCT/EP2014/070318.

*Primary Examiner* — Michael C Miggins

(57) ABSTRACT

The present disclosure relates to a polyethylene composition of Raised Temperature Resistance, having the following features:
1) a density from 0.935 to 0.945 g/cm$^3$;
2) a melt flow index MIF from 10 to 18 g/10 min;
3) a melt flow index MIP from 1 to 2.5 g/10 min; and
4) a MIF/MIP ratio from 5 to 10.

13 Claims, 1 Drawing Sheet

(56) References Cited

U.S. PATENT DOCUMENTS

2011/0282012 A1 11/2011 Kipke et al.
2013/0287983 A1 10/2013 Palmlöf et al.

FOREIGN PATENT DOCUMENTS

| WO | WO 2010/049167 A1 | 5/2010 |
| WO | WO 2010/049168 A1 | 5/2010 |
| WO | WO 2012/055932 A1 | 5/2012 |

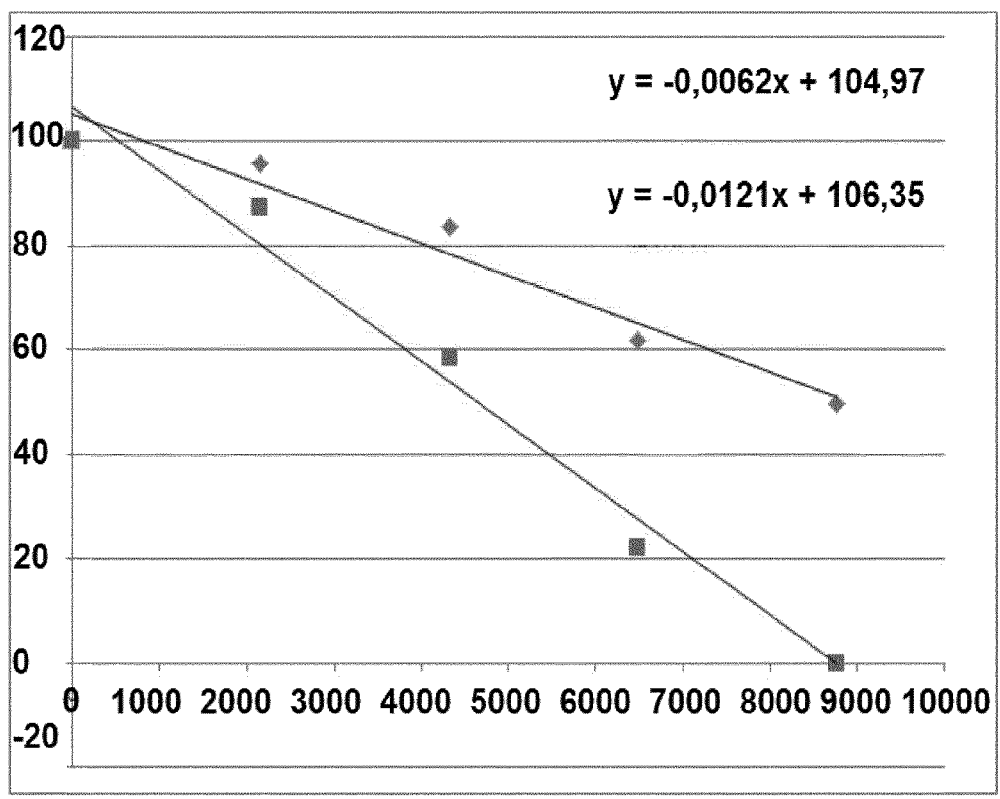

POLYETHYLENE OF RAISED TEMPERATURE RESISTANCE

This application is the U.S. National Phase of PCT International Application PCT/EP2014/070318, filed Sep. 24, 2014, claiming benefit of priority to European Patent Application No. 13188441.3, filed Oct. 14, 2013, the disclosures of which are incorporated herein by reference in their entirety.

FIELD OF THE INVENTION

The present disclosure relates to a novel polyethylene comprising Raised Temperature Resistance (PE-RT) for use in hot water piping and related systems.

BACKGROUND OF THE INVENTION

As explained in WIPO Pat. App. Pub. No. WO03033586, PE-RT materials are required to have a pressure test resistance, as determined according to DIN 16 833, of at least 165 h at 3.6 MPa and 95° C.

Moreover, they should be flexible, which translates into having an E-modulus of less than about 900 MPa.

According to WIPO Pat. App. Pub. No. WO03033586, such requirements are met by providing a multimodal polyethylene composition having a density of 0.921-0.950 g/cm$^3$ and comprising a HMW fraction having a density of at least 0.920 g/cm$^3$.

SUMMARY OF THE INVENTION

It has now been found that a particularly high balance of the said mechanical properties and resistance to oxidation and crosslinking is achieved by properly selecting specific rheological and molecular parameters.

The present disclosure provides a polyethylene composition having the following features:
1) a density from 0.935 to 0.945 g/cm$^3$, such as from 0.936 to 0.943 g/cm$^3$, as determined according to ISO 1183 at 23° C.;
2) a melt flow index (MIF) at 190° C. with a load of 21.60 kg, determined according to ISO 113, from 10 to 18 g/10 min., including from 12 to 18 g/10 min;
3) a melt flow index (MIP) at 190° C. with a load of 5 kg, determined according to ISO 113, from 1 to 2.5 g/10 min;
4) a MIF/MIP ratio from 5 to 10, such as from 6 to 9.

In addition to features 1) to 4) above, the polyethylene composition of the disclosure may also have one or more of the following features:
5) a $M_w/M_n$ ratio, where $M_w$ is the weight average molar mass and $M_n$ is the number average molar mass, both measured by GPC (Gel Permeation Chromatography) of 4 or more, including 5 or more and from 4 to 10, from 5 to 8, and from 5.5 to 8;
6) an intrinsic viscosity [η], as determined according to ISO 1628-1 and -3 in decalin at 135° C. by capillary viscosity measurement, from 1.8 to 2.8 dl/g;
7) a substantially linear chain structure;
8) a content of vinyl groups, determined by means of infrared (IR) analysis in accordance with ASTM D 6248-98, of from 0.3 to 0.7 vinyl groups/1000 carbon atoms;
9) a content of vinyl groups in the polymer fraction having an intrinsic viscosity (η) of less than 0.5 dl/g and of more than 0.3 vinyl groups/1000 carbon atoms, such as from 0.4 to 0.9 vinyl groups/1000 carbon atoms.

BRIEF DESCRIPTION OF THE DRAWINGS

These and other features, aspects, and advantages of the present disclosure will become better understood with reference to the following description and appended claims, and accompanying drawing where:

FIG. 1 shows the percentage of MIF decrease (Y axis) with aging time (in minutes, X axis) for the polymer of Example 1 (upper line) and the polymer of Comparative Example 1 (lower line).

It should be understood that the various embodiments are not limited to the arrangements and instrumentality shown in the drawing.

DETAILED DESCRIPTION OF THE INVENTION

The term "polyethylene composition(s)" refers to both a single ethylene polymer and an ethylene polymer composition, including a composition of two or more ethylene polymer components that may comprise different molecular weights.

In some embodiments, the polyethylene compositions of the present technology comprise copolymers of ethylene with 1-alkenes, or mixtures of ethylene homopolymers and said copolymers of ethylene with 1-alkenes.

Examples of suitable 1-alkenes in the copolymers according to present disclosure are $C_3$-$C_{20}$-alpha-olefins such as propene, 1-butene, 1-pentene, 1-hexene, 4-methyl-1-pentene, 1-heptene or 1-octene.

In certain embodiments, the amounts of 1-hexene in the copolymers are from 1.5-3.5%, such as from 2.0 to 3.0% by weight.

In some embodiments, the polyethylene compositions of the present disclosure have a substantially monomodal molecular mass distribution curve as determined by GPC, hence they are monomodal in GPC, because the individual molecular weight distributions of polymer sub-fractions overlap and do not resolve as to display two distinct maxima any more.

The mass distribution curve is not required to be perfectly bell-shaped; therefore it is merely "substantially" monomodal. Such a monomodal distribution may be obtained in situ in a one-pot reaction with a mixed or hybrid catalyst system, such as with mixed single-site catalysts, giving rise to a particularly homogenous, in situ mixture of different catalyst products in which homogeneity is generally not obtainable by conventional blending techniques.

For a "substantially linear chain structure" (feature (7) above), it is meant that the polyethylene composition of the present technology has a degree of long chain branching λ (lambda) of from 0 to 2 long chain branches/10 000 carbon atoms, such as from 0.1 to 1.5 long chain branches/10 000 carbon atoms. The degree of long chain branching λ (lambda) is measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch (LCB) Frequency in Polyethylenes, pages 254-269. The presence of LCB can further be determined from rheological data, see Trinkle et al. (Rheol. Acta 2002, 41:103-113; van Gurp-Palmen Plot—classification of long chain branched polymers by their topology).

The polyethylene composition of the disclosure is obtainable using the catalyst system described below. In some embodiments, a single site catalyst or catalyst system is employed for providing polyethylene according to the present technology. The present disclosure, in certain embodiments, employs a catalyst composition comprising at least two different single-site polymerization catalysts A) and B), of which A) is at least one metallocene polymerization catalyst and B) is at least one polymerization catalyst based on a non-metallocene transition metal complex, wherein in some embodiments B) is an iron complex component which iron complex more preferably has a tridentate ligand.

The metallocene catalyst A) is, in certain embodiments, at least one zirconocene catalyst or catalyst system. A zirconocene catalyst according to the present disclosure may be, for example, a cyclopentadienyl complex. The cyclopentadienyl complexes can be, for example, bridged or unbridged bis-cyclopentadienyl complexes as described, for example, in EP129368, EP561479, EP545304 and EP576970, bridged or unbridged monocyclopentadienyl 'half-sandwich' complexes such as the bridged amidocyclopentadienyl complexes described in EP416815, or half-sandwich complexes described in U.S. Pat. No. 6,069,213, U.S. Pat. No. 5,026, 798. Furthermore, they can be multinuclear cyclopentadienyl complexes as described in EP 632063, pi-ligand-substituted tetrahydropentalenes as described in EP659758 or pi-ligand-substituted tetrahydroindenes as described in EP 661300.

Other suitable metallocene catalysts A) are hafnocenes, such as hafnocene catalysts wherein the hafnium atom forms a complex with two cyclopentadienyl, indenyl or fluorenyl ligands, each ligand being optionally substituted with one or more $C_1$-$C_8$-alkyl and/or $C_6$-$C_8$ aryl groups, and the free valencies of the hafnium atom being saturated with halogen, such as chlorine, or $C_1$-$C_4$ alkyl or benzyl groups, or a combination of them.

Non-limiting examples of metallocene catalyst components consistent with the description herein include, for example:
bis(cyclopentadienyl)zirconiumdichloride;
bis(indenyl)zirconiumdichloride;
bis(1-methylindenyl)zirconiumdichloride;
bis(2-methylindenyl)zirconiumdichloride;
bis(1-propylindenyl)zirconiumdichloride;
bis(2-propylindenyl)zirconiumdichloride;
bis(1-butylindenyl)zirconiumdichloride;
bis(2-butylindenyl)zirconiumdichloride;
bis(methylcyclopentadienyl)zirconiumdichloride;
bis(tetrahydroindenyl)zirconiumdichloride;
bis(pentamethylcyclopentadienyl)zirconiumdichloride,
bis(1,2,4-trimethylcyclopentadienyl)zirconiumdichloride;
bis(1-n-butyl-3-methyl-cyclopentadienyl)zirconiumdichloride;
bis(dimethylsilylcyclopentadienylindenyl)zirconium dichloride;
bis(n-butylcyclopentadienyl)hafnium dichloride;
bis(indenyl) hafnium dichloride; and
bis(trimethysilylcyclopentadienyl) hafnium dichloride.

In some embodiments, for iron complexes B), reference is made to the disclosure in WIPO Pat. App. Pub. No. WO 2005/103096, incorporated herewith by reference.

In some embodiments, tridentate ligands for use in the present technology are 2,6-bis[1-(phenylimino)ethyl] pyridine and the corresponding compounds, wherein both the two phenyl groups are substituted in the ortho-position with a halogen or tert-alkyl substituent, such as with a chlorine or tert-butyl group, the free valencies of the iron atom being saturated with halogen, for instance chlorine, or $C_1$-$C_{10}$ alkyl, or $C_2$-$C_{10}$ alkenyl, or $C_6$-$C_{20}$ aryl groups, or a combination of them.

The preparation of the compounds for use in B) is described, for example, in J. Am. Chem. Soc. 120, p. 4049 ff. (1998), J. Chem. Soc., Chem. Commun. 1998, 849, and WIPO Pat. App. Pub. No. WO 98/27124. In non-limiting embodiments, examples of complexes for use in B) are:
2,6-bis[1-(2-tert.butylphenylimino)ethyl]pyridine iron(II) dichloride;
2,6-bis [1-(2-tert.butyl-6-chlorophenylimino)ethyl]pyridine iron(II) dichloride;
2,6-bis [1-(2-chloro-6-methylphenylimino)ethyl]pyridine iron(II) dichloride;
2,6-bis [1-(2-chloro-4,6-dimethylphenylimino)ethyl]pyridine iron(II) dichloride;
2,6-bis [1-(2,4-dichlorophenylimino)ethyl]pyridine iron(II) dichloride;
2,6-bis [1-(2,6-dimethylphenylimino)ethyl]pyridine iron(II) dichloride;
2,6-bis [1-(2,6-dichlorophenylimino)ethyl]pyridine iron(II) dichloride;
2,6-bis [1-(2,4-dichlorophenylimino)methyl]pyridine iron (II) dichloride;
2,6-bis [1-(2,4-dichloro-6-methylphenylimino)ethyl]pyridine iron(II) dichloride;
2,6-bis [1-(2,4-difluorophenylimino)ethyl]pyridine iron(II) dichloride;
2,6-bis [1-(2,4-dibromophenylimino)ethyl]pyridine iron(II) dichloride.

One sole zirconocene A) may be used as a catalyst under the same reaction conditions in the homopolymerization or copolymerization of ethylene in a single reactor along with one sole complex B), and wherein A) may produce a higher $M_w$ than B). In further embodiments, both the components A) and B) are supported. The two components A) and B) can be applied to different supports or together on a joint support. They may also be applied to a joint support in order to ensure a relatively close spatial proximity of the various catalyst centers and ensure good mixing of the different polymers formed. As for types and specifications of potential support materials, as well as for the use of activator components in addition to the catalyst, otherwise called co-catalysts, reference is made to WIPO Pat. App. Pub. No. WO 2005/103096, incorporated herewith by reference.

The use of co-catalyst components is well known in the art of ethylene polymerization, as are the polymerization processes as described in WIPO Pat. App. Pub. No. WO 2005/103096.

As support materials, in certain embodiments silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate may be used.

The inorganic supports, like silica, can be subjected to a thermal treatment, e.g. to remove adsorbed water.

Such a drying treatment is generally carried out at temperatures in arrange from 50° C. to 1000° C., such as from 100° C. to 600° C., with drying from 100° C. to 200° C. optionally being carried out under reduced pressure and/or under a blanket of inert gas (e.g. nitrogen), or the inorganic support can be calcined at temperatures from 200° C. to 1000° C. to produce the desired structure of the solid and/or set the desired OH concentration on the surface. The support can also be treated chemically using desiccants such as metal alkyls, including aluminum alkyls, chlorosilanes or SiCl$_4$, and methylaluminoxane. Appropriate treatment methods are described, for example, in WIPO Pat. App. Pub. No. WO 00/31090.

As a joint activator (co-catalyst) for the catalyst components A) and B), an aluminoxane, such as mono-methylaluminoxane (MAO), may be used in certain embodiments.

The molar ratio of the catalyst component A) to catalyst component B) is usually in a range from 100-1:1, such as from 20-5:1 and from 1:1 to 5:1.

The catalyst component A) may be applied in such an amount that the concentration of the transition metal from the catalyst component A) in the finished catalyst system is from 1 to 200 µmol, including from 5 to 100 µmol and from 10 to 70 µmol, per g of support. The catalyst component B) may be applied in such an amount that the concentration of iron from the catalyst component B) in the finished catalyst system is from 1 to 200 µmol, including from 5 to 100 µmol and from 10 to 70 µmol, per g of support.

The molar ratio of catalyst component A) to activator (co-catalyst) can be from 1:0.1 to 1:10000, such as from 1:1 to 1:2000. The molar ratio of catalyst component B) to activator (co-catalyst) is, in certain embodiments, in a range from 1:0.1 to 1:10000, such as from 1:1 to 1:2000.

The catalyst component A), the catalyst component B) and the activator (co-catalyst) are all supported on the same support by contacting them with the support in suspension in a solvent, such as a hydrocarbon having from 6 to 20 carbon atoms, including xylene, toluene, pentane, hexane, heptane or mixtures thereof.

The process for polymerizing ethylene, alone or with 1-alkenes, can be generally carried out at temperatures in a range from 0° C. to 200° C., such as from 20° C. to 200° C. and p from 25° C. to 150° C., and under pressures from 0.005 MPa to 10 MPa. The polymerization can be carried out in a known manner in bulk, in suspension, in the gas phase or in a supercritical medium in the customary reactors used for the polymerization of olefins.

The mean residence times are, in some embodiments, from 0.5 to 5 hours, such as from 0.5 to 3 hours. The advantageous pressure and temperature ranges for carrying out the polymerizations usually depend on the polymerization method.

Among the polymerization processes, gas-phase polymerization, including gas-phase fluidized-bed reactors, solution polymerization and suspension (slurry) polymerization, in loop reactors and stirred tank reactors may be used in some embodiments.

Hydrogen may be used as a molar mass regulator.

Furthermore, customary additives such as antistatics, can also be used in the polymerizations.

The polymerization is, in further embodiments, carried out in a single reactor.

The present disclosure further relates to a pipe, in particular a hot water pipe or a floor heating pipe, comprising the polyethylene composition of the present disclosure.

The pipe can be a monolayer pipe or can comprise two or more layers, wherein at least one layer comprises the polyethylene composition of the present disclosure.

In particular, for "comprising" it is meant here that the pipe, or the at least one layer, comprise from 50% to 100% by weight of the polyethylene composition of the present disclosure.

Hot water pipes and floor heating pipes are well known pipes that may be produced using the polyethylene composition described herein.

These pipes are generally prepared by extrusion and by using preparation processes and equipment well known in the art.

For hot water, it is generally meant water at a temperature of 60° C. or higher.

EXAMPLES

The following examples are included to demonstrate certain embodiments of the disclosure. It should be appreciated by those of skill in the art that the techniques disclosed in the examples which follow represent techniques discovered by the inventors to function well in the practice of the technology. However, those of skill in the art should, in light of the present disclosure, appreciate that many changes can be made in the specific embodiments which are disclosed and still obtain a like or similar result without departing from the spirit and scope of the technology.

Unless otherwise stated, the following test methods are used to determine the properties reported in the detailed description and in the examples.

Density

Determined according to ISO 1183 at 23° C.

Melt Flow Index (MI)

Determined according to ISO 1133 at 190° C. with the specified load.

Intrinsic Viscosity [η]

Determined according to ISO 1628-1 and -3 in decalin at 135° C. by capillary viscosity measurement.

$M_w$, $M_n$ and $M_w/M_n$

The determination of $M_w$, $M_n$ and $M_w/M_n$ derived therefrom is carried out by high-temperature gel permeation chromatography using a method described in DIN 55672-1:1995-02 issue February 1995. The deviations according to the mentioned DIN standard are as follows: solvent: 1,2,4-trichlorobenzene (TCB), temperature of apparatus and solutions: 135° C. and as concentration detector a PolymerChar (Valencia, Paterna 46980, Spain) IR-4 infrared detector, suited for use with TCB.

Applying the universal calibration method based on the Mark-Houwink constants given may be inferred from ASTM-6474-99, along with further explanations on using an additional internal standard-PE for spiking a given sample during chromatography runs after calibration.

A WATERS Alliance 2000 equipped with the precolumn SHODEX UT-G and separation columns SHODEX UT 806 M (3×) and SHODEX UT 807 connected in series was used. The solvent was vacuum distilled under nitrogen and was stabilized with 0.025% by weight of 2,6-di-tert-butyl-4-methylphenol. The flow rate was 1 ml/min, the injection volume was 500 µl and polymer concentration was in a range of 0.01%<conc.<0.05% w/w. The molecular weight calibration was established by using monodispersed polystyrene (PS) standards from Polymer Laboratories (now Varian, Inc., Essex Road, Church Stretton, Shropshire, SY6 6AX, UK) in a concentration range from 580 g/mol up to 11600000 g/mol, and further supplemented with hexadecane. The calibration curve was then adapted to polyethylene (PE) by means of the Universal Calibration method (Benoit H., Rempp P. and Grubisic Z., J. Polymer Sci., Phys. Ed., 5, 753(1967)). The Mark-Houwing parameters used were for PS: kPS=0.000121 dl/g, αPS=0.706 and for PE kPE=0.000406 dl/g, αPE=0.725, valid in TCB at 135° C. Data recording, calibration and calculation was carried out using NTGPC_Control_V6.02.03 and NTGPC_V6.4.24

(HS-Entwicklungsgesellschaft für wissenschaftliche Hard- und Software mbH, Hauptstraße 36, D-55437 Ober-Hilbersheim), respectively.

Content of Vinyl Groups

The content of vinyl groups/1000 carbon atoms is determined by means of IR, according to ASTM D 6248-98.

The content of vinyl groups/1000 carbon atoms in the individual polymer mass fractions is determined by the solvent-non-solvent extraction method of Holtrup (W. Holtrup, Makromol. Chem. 178, 2335 (1977)), coupled with IR.

Xylene and ethylene glycol diethyl ether at 130° C. are used as solvents for fractionation and 5 g of polyethylene are split up into 8 fractions by Holtrup fractionation.

Comonomer Content

The comonomer content is determined by means of $^{13}$C-NMR as explained in James. C. Randall, JMS-REV. Macromol. Chem. Phys., C29 (2&3), 201-317 (1989).

Pressure Test

Carried out according to DIN 16 833 at 3.6 MPa, 95° C.

E-Modulus

Measured according to ISO 527-2/1A/50.

Example 1

Preparation of the Individual Components of the Catalyst System

Complexes 1 and 2 were used for the catalyst preparation.

Complex 1 is bis(1-n-butyl-3-methyl-cyclopentadienyl) zirconium dichloride and is commercially available from Albemarle Inc.

Complex 2 is 2,6-bis[1-(2-chloro-4,6-dimethylphenylimino)ethyl]pyridine iron (II) dichloride.

2,6-bis[1-(2-chloro-4,6-dimethylphenylimino)ethyl]pyridine was prepared with the same synthetic route as in Example 1 of WIPO Pat. App. Pub. No. WO2008107135 and reacted with iron (II) dichloride to form complex 2, as likewise disclosed in WIPO Pat. App. Pub. No. WO2008107135.

Methylalumoxane (MAO) was received from Chemtura Inc. as a 30% (w/w) toluene solution.

Support

XPO-2326A, a spray-dried silica gel from Grace.

Support Pretreatment

XPO-2326 A was calcinated at 600° C. for 6 hours.

Preparation of the Catalyst System

A solution containing 4459.5 g of complex 1 and 90.425 g of complex 2 in 48.7 kg of MAO (4.75 M in toluene) and 12.4 l of toluene was prepared. This solution was added within an hour to 40 kg of calcinated XPO-2326A at 0° C. and stirred for one hour. Then 107 L heptane was added to the reaction mixture so that a slurry was obtained. The slurry of the catalyst was stirred for 30 min. The catalyst was been washed with heptane, filtered and dried with nitrogen flow until 80.55 kg of a free flowing powder with an ivory color was obtained. The bulk density of the powder was 438 g/L and the residual solvent content was 29.7 weight %.

Polymerization Process

Polymerization was carried out in a typical Phillips slurry loop process at 4 t/h, 75° C., 13% ethylene, 4 MPa, in isobutene using the above prepared catalyst. 1-hexene (120 kg/h) was used as the comonomer. Hydrogen (2 g/h) was used to adjust the melt flow index of the product. The obtained powder was additivated and pelletized to obtain the product of Example 1. The polymer properties are reported in Table 1.

Comparative Example 1

The polyethylene of Comparative Example 1 is a sample of the commercial product Hostalen 4731B, sold by LyondellBasell and prepared by slurry multi-step polymerization with a Ziegler-Natta catalyst. The polymer properties are reported in Table 1.

Comparative Example 2

The polyethylene of Comparative Example 2 is a sample of the commercial product LP3721 C, sold by LyondellBasell and prepared by gas phase polymerization with a Cr-based catalyst. The polymer properties are reported in Table 1.

TABLE I

| | | Example | | |
|---|---|---|---|---|
| | | Ex. 1 | Comp. Ex. 1 | Comp. Ex. 2 |
| Comonomer | | Hexene-1 | Butene-1 | Hexene-1 |
| Properties | Unit | | | |
| Vinyl double bonds/1000 C | | 0.5 | 0.1 | 0.7 |
| Holtrup Fraction 1 ([η] < 0.5) Vinyl double bonds/1000 C | | 0.7 | 0.1 | 0.75 |
| Comonomer | weight % | 2.5 | 1.38 | 2.6 |
| Density | g/cm$^3$ | 0.942 | 0.948 | 0.938 |
| MI 2.16 kg | g/10 min | 0.69 | 0.6 | 0.13 |
| MI 5 kg (MIP) | g/10 min | 1.86 | 1.85 | 0.67 |
| MI 21.6 kg (MIF) | g/10 min | 13.9 | 28 | 13.0 |
| MIF/MIP | | 7.5 | 15.1 | 19.4 |
| [η] | dl/g | 2.27 | 2.41 | 2.7 |
| $M_w$ (GPC) | g/mol | 142500 | 224000 | — |
| $M_n$ (GPC) | g/mol | 25500 | 13000 | — |
| $M_w/M_n$ | | 5.6 | 17.0 | 16 |
| DIN 16 833 | h | >9500(*) | >15000 | 2600 |
| E-modulus | MPa | 800 | 850 | 650 |

(*)Still running

As can be seen from the data in Table 1, the polyethylene composition of Example 1 has a very high pressure resistance according to DIN 16 833, and an optimal E-modulus value. The pressure resistance is advantageously higher than for the polyethylene material of Comparative Example 2.

It may be noted that in the polyethylene composition, such a favorable balance of properties is achieved in combination with a rather high MIP value, which means that the polyethylene composition of the present technology exhibits superior processability in the molten state.

It has also been found that, in an aging test carried out in air atmosphere at 120° C., the MIF value of the polyethylene composition of the present technology undergoes a much lower decrease with aging time with respect to a standard PE-RT materials, including the polyethylene material of Comparative Example 1.

The respective trends are shown in FIG. 1, wherein the percentage of MIF decrease (Y axis) with aging time (minutes, X axis) is reported for the polymer of Example 1 (upper line) and the polymer of Comparative Example 1 (lower line). This property is very much desired for hot water applications with working temperatures higher than 80° C.

In addition, a drop in melt flow index may indicate that the material properties change in the presence of a strong oxidant such as oxygen.

Although the present disclosure and its benefits have been described in detail, it should be understood that various changes, substitutions and alterations can be made herein without departing from the spirit and scope of the disclosure as defined by the appended claims. Moreover, the scope of the present disclosure is not intended to be limited to the particular embodiments of the process, machine, manufacture, compositions of matter, means, methods and steps described in the specification. As one of the ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A polyethylene composition comprising:
   1) a density (ISO 1183, 23° C.) from 0.935-0.945 g/cm$^3$;
   2) a melt flow index (MIF; ISO 113, 190° C., 21.60 kg) from 10-18 g/10 min;
   3) a melt flow index (MIP; ISO 113, 190° C., 5 kg) from 1-2.5 g/10 min; and
   4) a MIF/MIP ratio from 6-9;
   5) an $M_w/M_n$ ratio, where $M_w$ is the weight average molar mass and $M_n$ the numerical average molar mass, both measured by GPC (gel permeation chromatography) of 5 or more.

2. The polyethylene composition of claim 1, prepared by using in polymerization a catalyst composition comprising at least two different single-site polymerization catalysts A) and B), of which A) is at least one metallocene polymerization catalyst and B) is at least one polymerization catalyst based on a non-metallocene transition metal complex.

3. The polyethylene composition of claim 1, wherein the density of the polyethylene composition ranges from 0.936-0.943 g/cm$^3$.

4. The polyethylene composition of claim 1, wherein the melt flow index MIF at 190° C. with a load of 21.60 kg, determined according to ISO 113, ranges from 12-18 g/10 min.

5. The polyethylene composition of claim 1, further comprising one or more of:
   6) an intrinsic viscosity [η], determined according to ISO 1628-1 and ISO 1628-3 in decalin at 135° C. by capillary viscosity measurement, from 1.8-2.8 dl/g;
   7) a substantially linear chain structure;
   8) a content of vinyl groups, determined by means of infrared (IR) analysis in accordance with ASTM D 6248-98, of 0.3-0.7 vinyl groups/1000 carbon atoms; and
   9) a content of vinyl groups in the polymer fraction having an intrinsic viscosity [η] of less than 0.5 dl/g and more than 0.3 vinyl groups/1000 carbon atoms.

6. The polyethylene composition of claim 5, wherein the content of vinyl groups in the polymer fraction having an intrinsic viscosity [η] of less than 0.5 dl/g and from 0.4-0.9 vinyl groups/1000 carbon atoms.

7. The polyethylene composition of claim 5, prepared by using in polymerization a catalyst composition comprising at least two different single-site polymerization catalysts A) and B), of which A) is at least one metallocene polymerization catalyst and B) is at least one polymerization catalyst based on a non-metallocene transition metal complex.

8. The polyethylene composition of claim 5, wherein the $M_w/M_n$ ratio ranges from 5-10.

9. The polyethylene composition of claim 8, wherein the $M_w/M_n$ ratio ranges from 5.5-8.

10. A pipe comprising the polyethylene composition of claim 1.

11. The pipe of claim 10, wherein the pipe is a hot water pipe or a floor heating pipe.

12. The pipe of claim 10 comprising two or more layers, wherein at least one layer comprises the polyethylene composition of claim 1.

13. The pipe of claim 12, wherein the pipe is a hot water pipe or a floor heating pipe.

* * * * *

UNITED STATES PATENT AND TRADEMARK OFFICE
CERTIFICATE OF CORRECTION

PATENT NO. : 9,671,047 B2
APPLICATION NO. : 15/028690
DATED : June 6, 2017
INVENTOR(S) : Heinz Vogt et al.

Page 1 of 1

It is certified that error appears in the above-identified patent and that said Letters Patent is hereby corrected as shown below:

In the Specification

| | | |
|---|---|---|
| Column 4 | Line 9 | Delete "2,6-bis[1-(2-tert.butylphenylimino)ethyl]pyridine iron(II) dichloride;" and insert --2,6-bis[1-(2-tert-butylphenylimino)ethyl]pyridine iron(II) dichloride;-- |
| Column 4 | Line 11 | Delete "2,6-bis [1-(2-tert-butyl-6-chlorophenylimino)ethyl]pyridine iron(II) dichloride;" and insert --2,6-bis [1-(2-tert-butyl-6-chlorophenylimino)ethyl]pyridine iron(II) dichloride;-- |
| Column 6 | Line 32 | Delete "$M_w/M_r$" and insert --$M_w/M_n$-- |

In the Claims

| | | |
|---|---|---|
| Column 9 | Line 20 | In Claim 1, after "min;", delete "and" |
| Column 9 | Line 21 | In Claim 1, after "6-9;", insert --and-- |
| Column 9 | Line 23 | In Claim 1, before "the", insert --is-- |

Signed and Sealed this
Twenty-eighth Day of January, 2020

Andrei Iancu
*Director of the United States Patent and Trademark Office*